(12) United States Patent
Talavasek et al.

(10) Patent No.: US 9,010,792 B2
(45) Date of Patent: Apr. 21, 2015

(54) TORQUE ELEMENT FOR A MOTOR-DRIVEN BICYCLE

(75) Inventors: Jan Talavasek, Knonau (CH); Amber R. Lucas, Luzern (CH); Robert F. Meyer, Mountain View, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 119 days.

(21) Appl. No.: 13/422,810

(22) Filed: Mar. 16, 2012

(65) Prior Publication Data
US 2013/0241175 A1 Sep. 19, 2013

(51) Int. Cl.
*B62K 11/00* (2006.01)
*B62M 6/40* (2010.01)
*B62K 19/40* (2006.01)

(52) U.S. Cl.
CPC . *B62M 6/40* (2013.01); *B62K 19/40* (2013.01)

(58) Field of Classification Search
CPC ................................. B62M 6/40; B62K 19/40
USPC .............. 180/220, 227, 221; 280/288.4, 285, 280/286, 284, 279, 288; 301/105.1, 110.5, 301/124.2
See application file for complete search history.

(56) References Cited

U.S. PATENT DOCUMENTS

| | | | | |
|---|---|---|---|---|
| 3,610,659 A * | 10/1971 | Gerarde | ........................ | 280/169 |
| 5,823,555 A * | 10/1998 | Ashman | ........................ | 280/279 |
| 6,089,675 A | 7/2000 | Schlanger | | |
| 2010/0264622 A1* | 10/2010 | Bastianen | ................... | 280/281.1 |
| 2013/0015009 A1* | 1/2013 | Lin et al. | ........................ | 180/220 |

FOREIGN PATENT DOCUMENTS

| | | |
|---|---|---|
| EP | 1595784 | 3/2008 |
| EP | 2110299 | 10/2009 |
| WO | 2010091524 | 8/2010 |

* cited by examiner

*Primary Examiner* — Joseph Rocca
*Assistant Examiner* — Jacob Knutson
(74) *Attorney, Agent, or Firm* — Michael Best & Friedrich LLP (57) ABSTRACT

A bicycle including a wheel that has an axle with a first end and a second end, a motor coupled to the axle, and a frame supported by the wheel. The frame includes a first dropout and a second dropout, and the first dropout defines a recess. The bicycle also includes a torque element that is secured to the first end of the axle and that is shaped to fit within the recess of the first dropout to inhibit rotation of the axle relative to the frame in response to torque from the motor.

12 Claims, 8 Drawing Sheets

TORQUE ELEMENT FOR A MOTOR-DRIVEN BICYCLE

BACKGROUND

The present invention relates generally to bicycles, and more specifically to motor-driven electric bicycles.

Bicycles commonly have a main frame and a front fork pivotally secured to the main frame. The main frame typically includes a top tube, a down tube, a seat tube, and a rear wheel mount for receiving a rear wheel axle. The front fork typically includes a front wheel mount for receiving a front wheel axle. Steering control of the bicycle is provided by a handlebar that is usually secured to the front fork via a handlebar stem.

Some bicycles also include a hub motor that is mounted to the rear axle to assist with propelling the bicycle. In existing motor-driven electric bicycles, torque from the motor is transferred to the frame. Often, the torque exceeds the clamping forces on the rear axle, which causes the axle to spin freely relative to the frame. In some instances, a torque arm is externally bolted to the frame using a special connector and is further coupled to the axle to prevent axle rotation. Existing torque arms are prone to failure, and when they do fail, wires connected to the motor can become tangled and/or destroyed, potentially injuring the rider.

SUMMARY

The present invention provides a bicycle including a wheel that has an axle with a first end and a second end, a motor coupled to the axle, and a frame supported by the wheel. The frame includes a first dropout and a second dropout. The first dropout defines a recess, and the bicycle includes a torque element that is secured to the first end of the axle and that is shaped to fit within the recess of the first dropout to inhibit rotation of the axle relative to the frame in response to torque from the motor.

In one construction, the present invention provides a bicycle including a wheel that has an axle with a non-cylindrical first end and a second end, and a motor coupled to the axle. The bicycle also includes a frame that is supported by the wheel and that has a dropout with the first wall that defines a recess, and a torque element that is non-rotationally coupled to the first end of the axle. The torque element includes a second wall that is engageable with the first wall to inhibit rotation of the axle in response to torque from the motor.

In another construction, the present invention provides a method of preventing rotation of an axle the bicycle that has a dropout with a recess. The method includes coupling a motor to the axle, attaching a torque element to an end of the axle, engaging the torque element with the dropout within the recess, and inhibiting rotation of the axle in response to torque from the motor.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
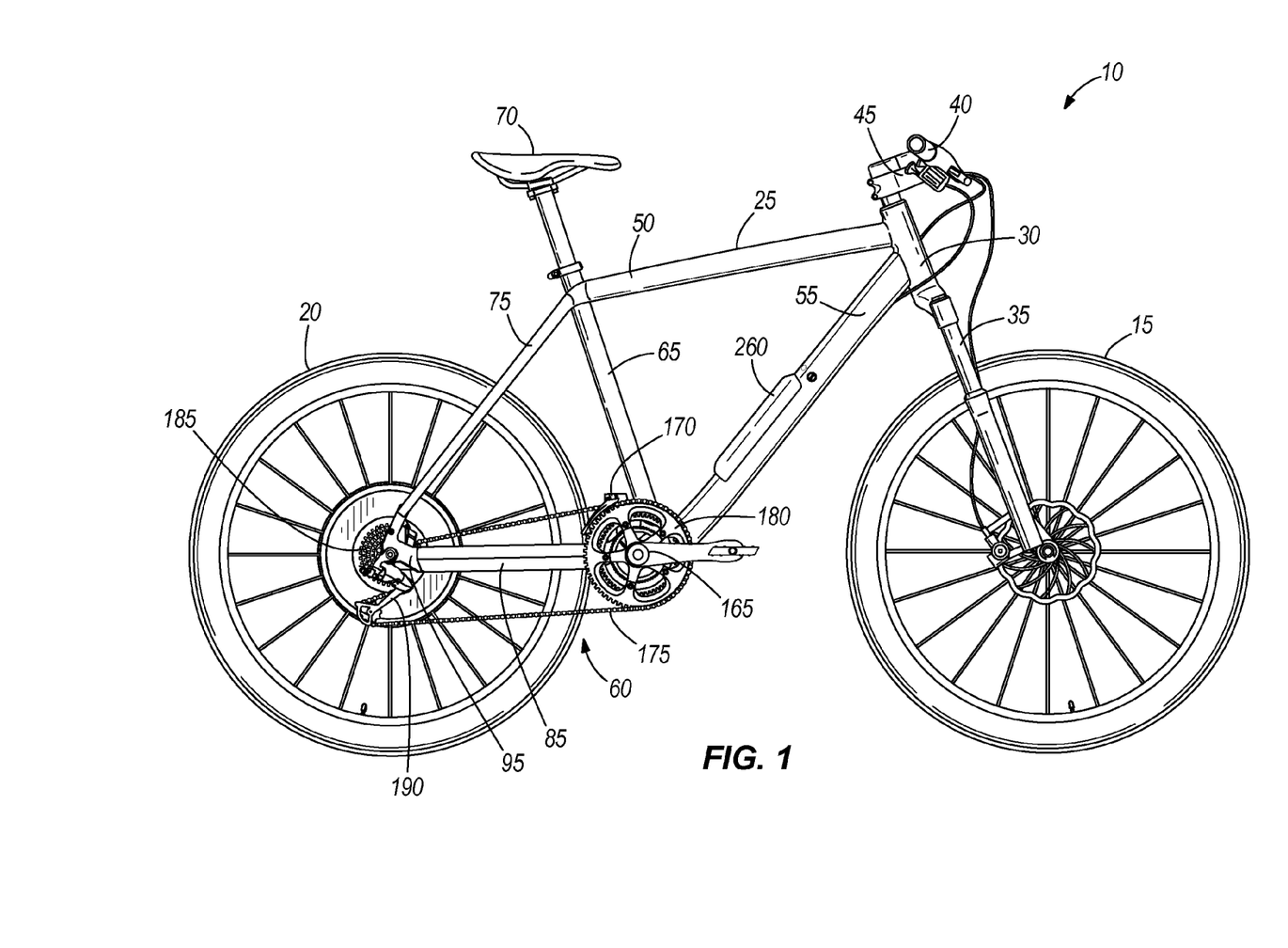
FIG. 1 is a side view of a bicycle including a frame embodying the present invention.

FIG. 1 shows a bicycle 10 that includes a front wheel 15, a rear wheel 20, and a frame 25. The frame 25 has a head tube 30 and a front fork 35 rotationally supported by the head tube 30 and that secures the front wheel 15 to the frame 25. A handlebar assembly 40 is coupled to the head tube 30 and is secured to the front fork 35 by a stem assembly 45. The frame 25 also has a top tube 50 connected to and extending rearward from the head tube 30, and a down tube 55 connected to the head tube 30 below the top tube 50 and extending generally downward toward a drive train 60. A seat tube 65 is connected to the top tube 50 and the down tube 55, and a seat 70 is supported by the seat tube 65.

Figure 2:
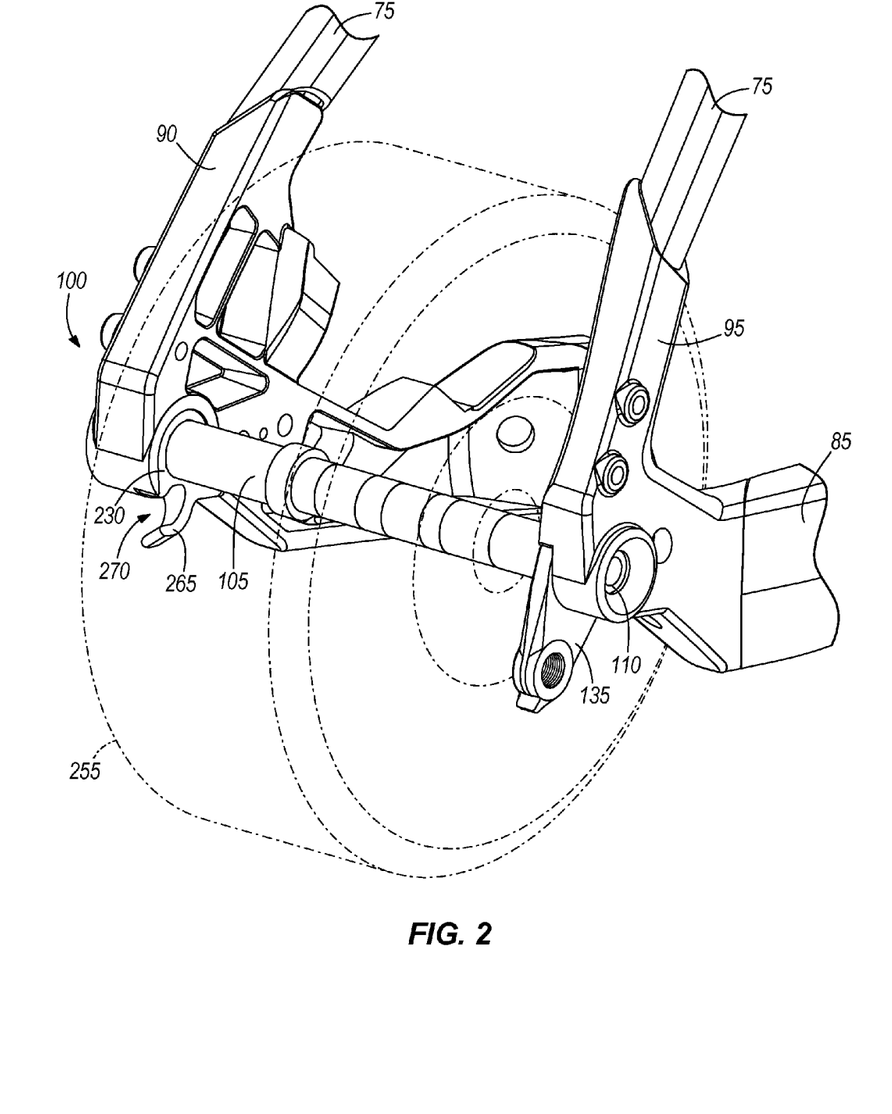
FIG. 2 is a perspective view of a rear axle area of the bicycle illustrated in FIG. 1, including left and right dropouts, an axle, a motor, and a torque element positioned between the left dropout and the axle.
Figure 4:
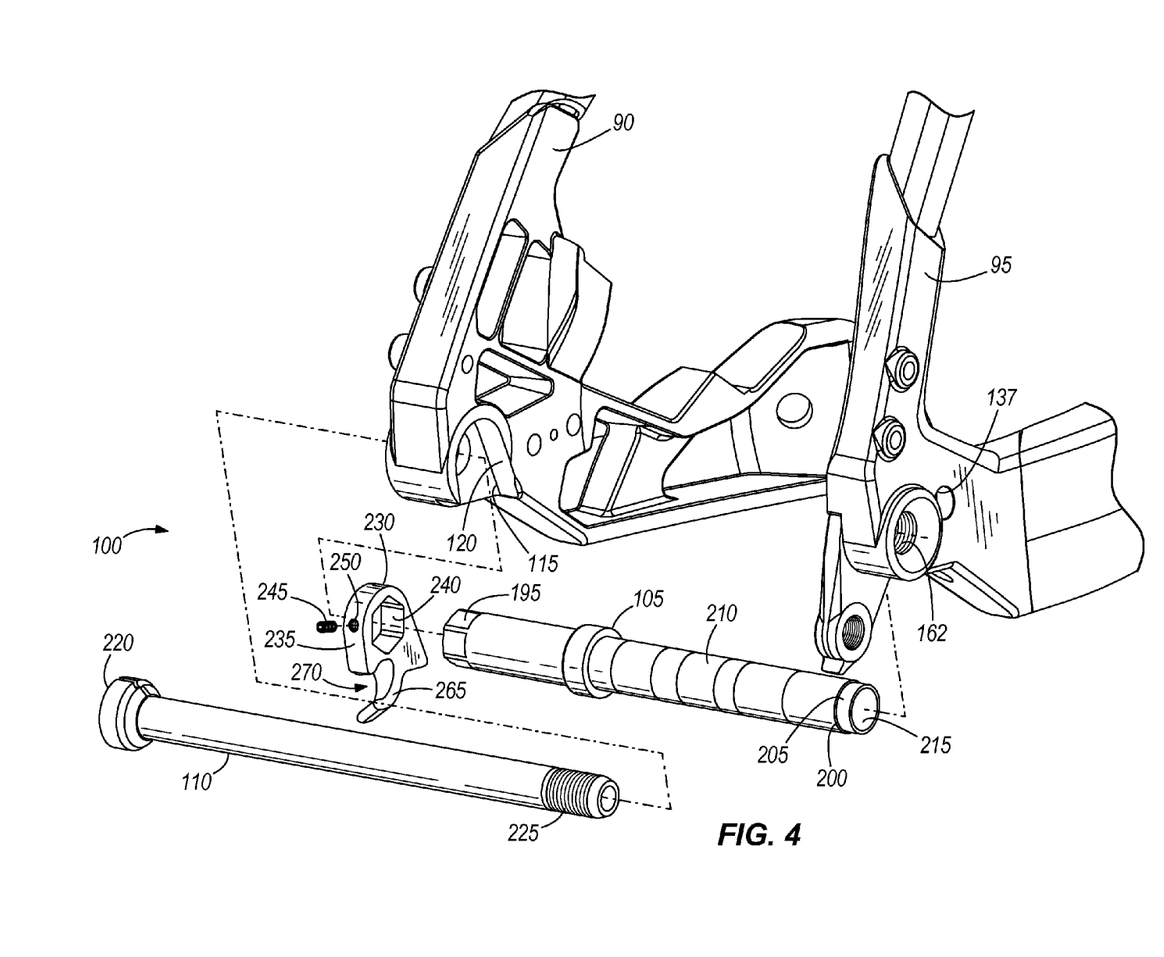
FIG. 4 is an exploded view of a portion of the rear axle area illustrated in FIG. 2, including the dropouts, the axle, and the torque element.

With reference to FIGS. 1 and 2, the frame 25 also includes a rear triangle that is connected to the rear wheel 20. The rear triangle includes opposed seatstays 75 (one shown), a left chainstay 80, and a right chainstay 85. A left dropout 90 is disposed at a lower end of the one seatstay 75 and is connected to the left chainstay 80. A right dropout 95 is disposed at the lower end of the right seatstay 75 and is connected to the right chainstay 85. FIGS. 2 and 4 show that a rear axle system 100 of the rear wheel 20 includes an axle 105 extending between the dropouts and an axle rod 110 that secures the rear wheel 20 in the dropouts 90, 95 to rotatably attach the rear wheel 20 to the frame 25. Although not shown, a bearing set (not shown) couples a hub (not shown) to the axle 105 such that the rear wheel 20 can freely rotate about the axle 105.

Figure 5:
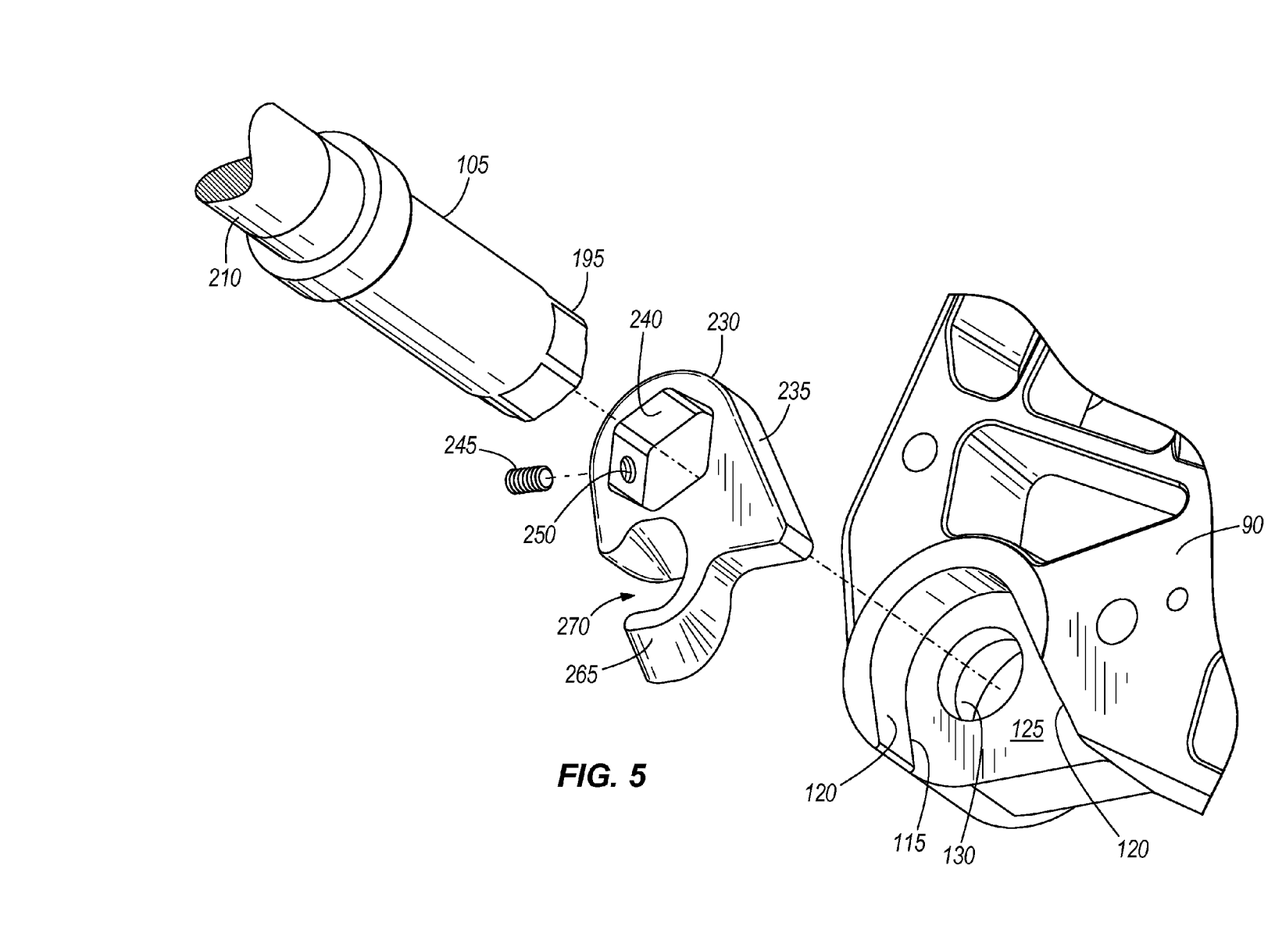
FIG. 5 is an exploded perspective view of the left dropout, the axle, and the torque element.

FIGS. 4 and 5 show that the left dropout 90 has a recess 115 accessible from adjacent a lower edge or bottom of the dropout 90 and from the interior or wheel side of the frame 25. The recess 115 is defined by converging side walls 120 (interior walls) and a planar bottom surface 125. Each of the illustrated converging side walls 120 has a planar section and is joined to the other wall 120 at an apex of the recess 115. A hole 130 extends through the left dropout 90 near the apex of the converging walls 120, and the axle 105 is aligned with the hole 130.

Figure 3:
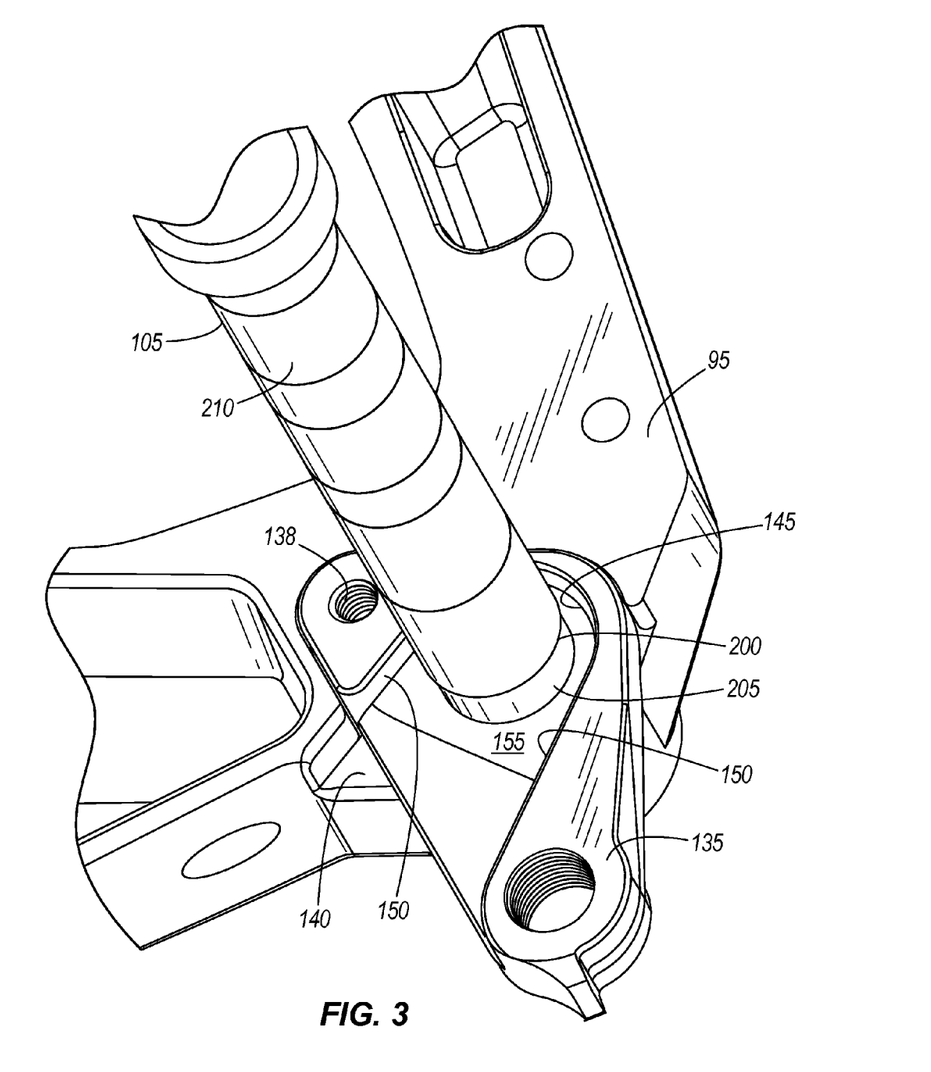
FIG. 3 is a perspective view of a portion of the rear axle and the right dropout.
Figure 6:
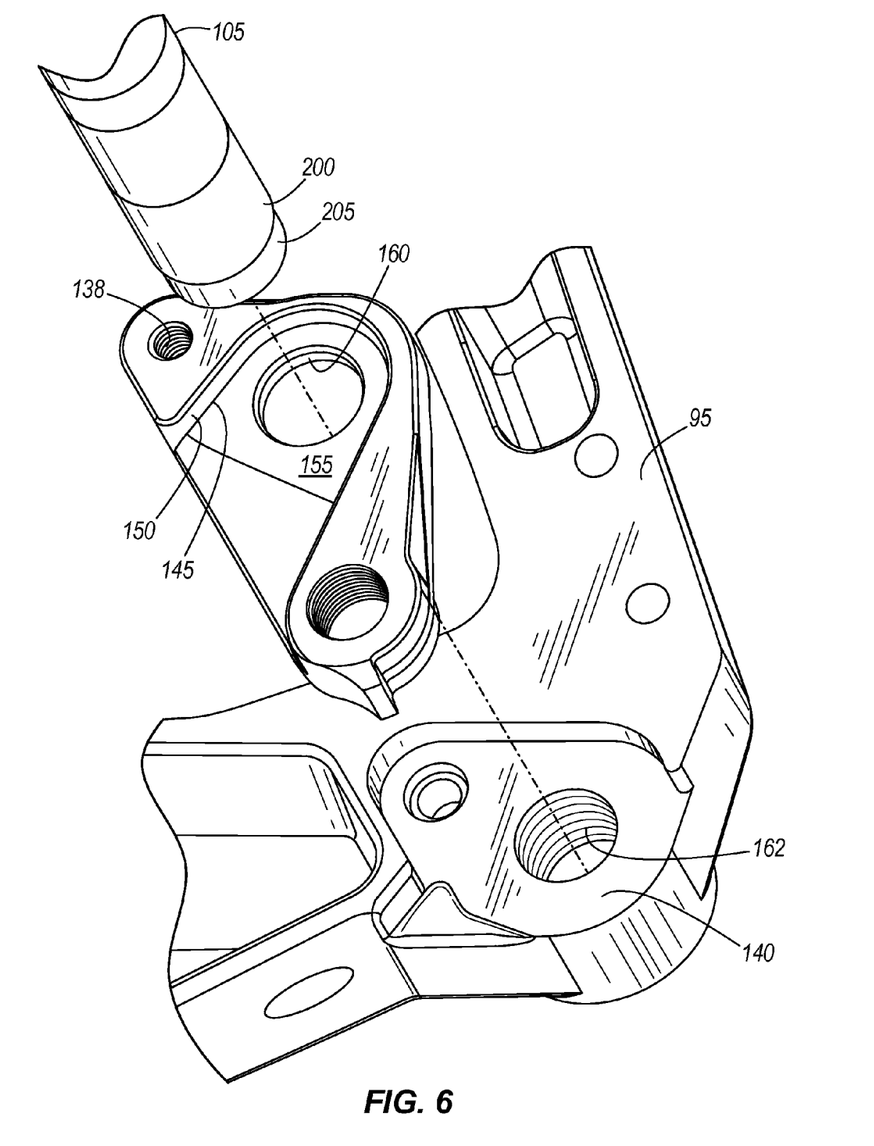
FIG. 6 is an exploded perspective view of the right dropout, the axle, and a rear derailleur hanger.

Referring to FIGS. 2-4 and 6, a rear derailleur hanger 135 is connected to the right dropout 95 using a fastener 137 (see FIG. 4) that is threaded into a hole 138. As illustrated in FIGS. 3 and 6, the hanger 135 is keyed into a recessed area 140 of the right dropout 95 and has a recess 145 on one side of the hanger body. The recess 145 is shaped to receive the axle 105 and is accessible from adjacent a lower edge or bottom of the right dropout 95 and from an interior or wheel side of the frame 25.

In particular, the recess 145 of the right dropout 95 is defined by converging side walls 150 and a planar bottom surface 155 similar to the recess 115 of the left dropout 90. Also like the recess 115, each of the illustrated converging side walls 150 has a planar section and is joined to the other wall 150 at an apex of the recess 145. A hole 160 (FIG. 6) of the hanger 135 near the apex of the converging walls 150 aligns with a threaded hole 162 extending through the right dropout 95 near the apex of the converging walls 150 to receive the axle rod 110, as explained in detail below.

In other constructions, the rear derailleur hanger 135 may be formed as a single piece with the right dropout 95, the hanger 135 may be connected in a different way (e.g., welding, brazing, adhesive), or the hanger 135 may be attached to a different component (e.g., the rear right chainstay 85, the right seatstay 75) Additionally, the left chainstay 80 and the left seatstay 75 may be formed as a single piece or be coupled together differently. Likewise, the right chainstay 85 and the right seatstay 75 may be formed as a single piece or be coupled together differently, as desired.

As illustrated, the recesses 115, 145 of both dropouts 90, 95 are generally wedge-shaped (see FIGS. 5 and 6) when viewed from the interior side of the frame 25, although either or both recesses 115, 145 can have different shapes. The wide mouth or opening defined by each recess 115, 145 near the lower edge of the respective dropouts 90, 95 provides a relatively large access opening for receiving the axle 105 so that the rear wheel 20 can be easily attached to the frame 25 within the dropouts 115, 145. Although the recess 145 of the right dropout 95 is illustrated as being shallower than the recess 115 of the left dropout 90, the recess 145 can have the same or different depth relative to the recess 115.

With reference back to FIG. 1, the drive train 60 includes a crankset 165 that is rotatably mounted to a bottom bracket (not shown). A front derailleur 170 shifts a chain 175 between different chain rings 180 (one shown), and is actuated by the handlebar assembly 40. A plurality of rear cogs 185 are mounted to the rear wheel 20 and connected to the crankset 165 by the chain 175. A rear derailleur 190 is attached to the derailleur hanger 135 and shifts the chain 175 between different rear cogs 185 and is actuated by the handlebar assembly 40.

FIGS. 2-4 show that the axle 105 includes a first end 195 disposed in the left dropout 90, and a second end 200 engaged with the rear derailleur hanger 135 and disposed in the right dropout 95. With reference to FIGS. 4 and 5, the first end 195 has a keyed or hexagonal shape, although the first end 195 can have any suitable non-cylindrical shape or polygonal shape. Stated another way, the first end 195 is non-circular in cross-section. As illustrated in FIGS. 4 and 6, the second end 200 is substantially cylindrical and has a stepped taper 205. A central portion 210 of the axle 105 extends between the first and second ends 195, 200 to support bearings (not shown).

Figure 7:
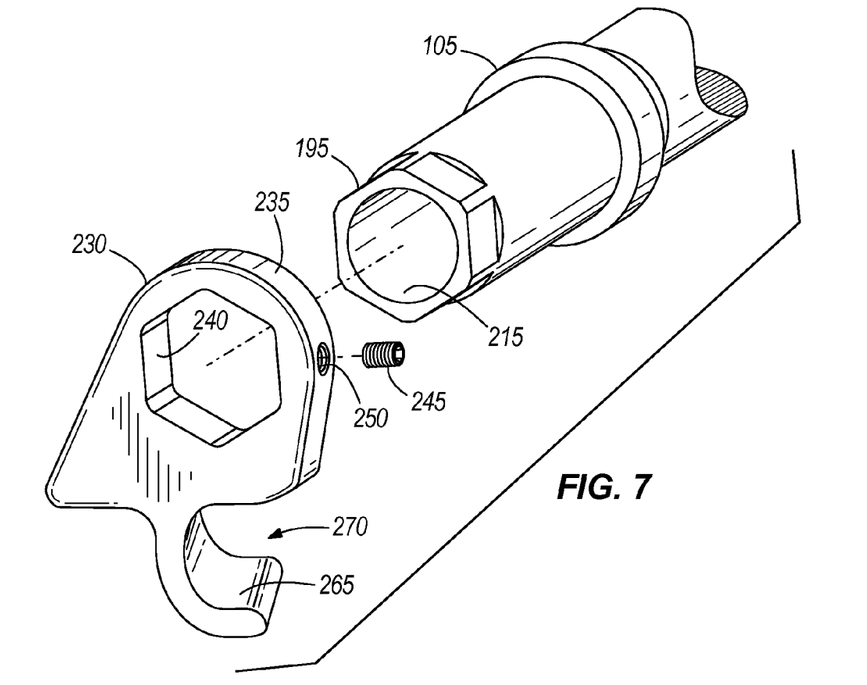
FIG. 7 is a perspective view of the axle and the torque element prior to assembly.
Figure 8:
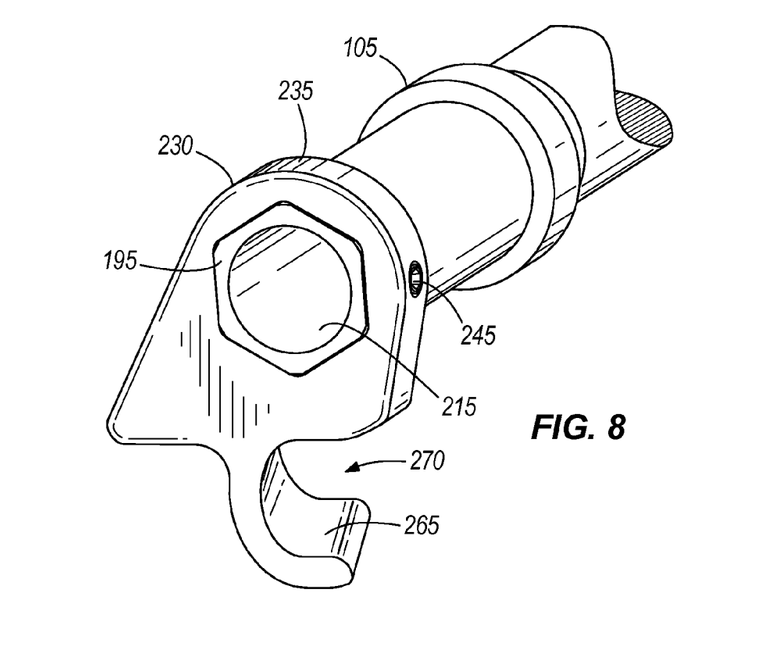
FIG. 8 is a perspective view of the torque element attached to the axle.
Figure 9:
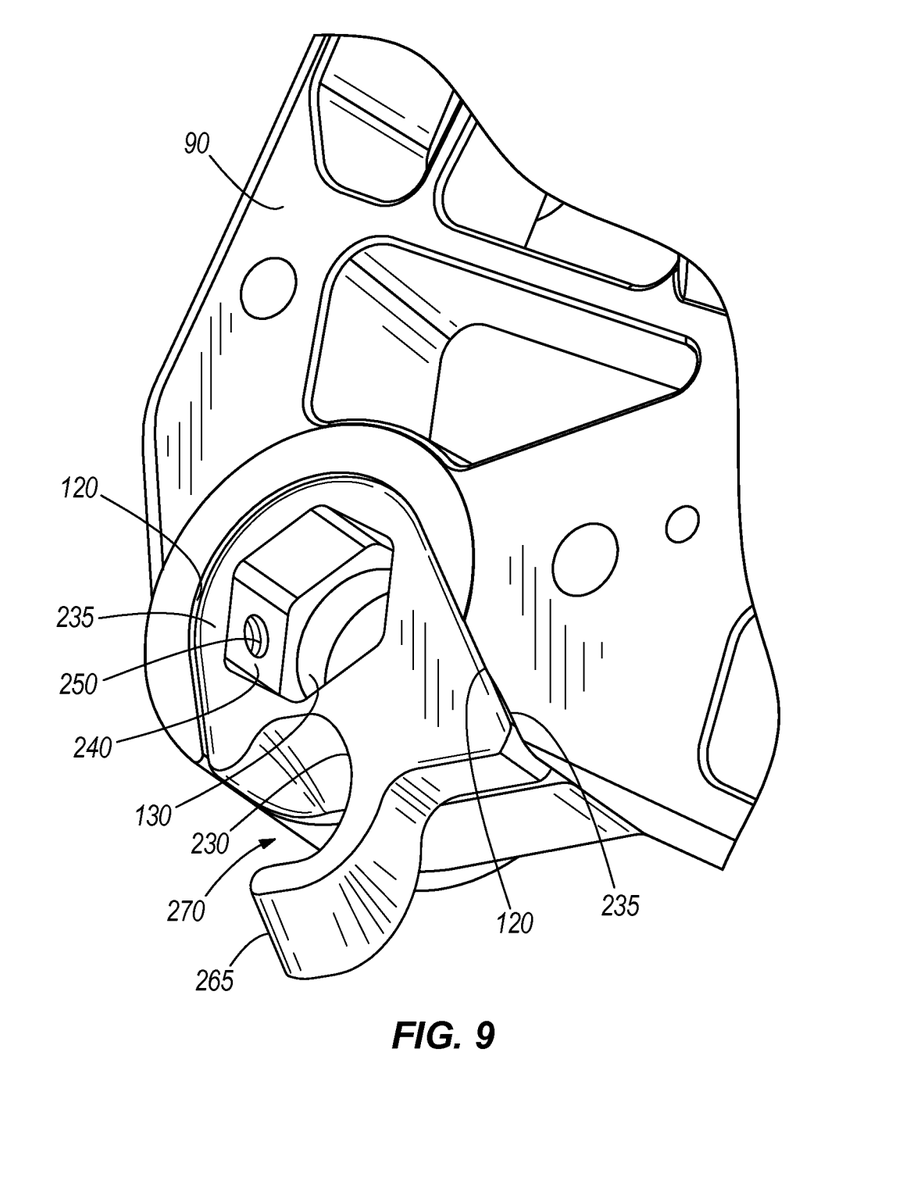
FIG. 9 is a perspective view of the interior side of the torque element nested in the left dropout.

With reference to FIGS. 4, 7, and 8, a passageway 215 extends through the axle 105 from the first end 195 to the second end 200 to receive the axle rod 110 when the rear axle system 100 is assembled onto the bicycle 10. FIG. 4 shows that the axle rod 110 has a head 220 engageable by a tool (e.g., Allen wrench or another wrench, screw driver, etc.) and a threaded distal end 225. As illustrated, the axle 105 is aligned with the holes 160, 162 so that the axle rod 110 can extend through the left dropout 90, the axle 105, and the hanger 135, and threadably engage the right dropout 95 within the hole 162 to secure the rear wheel 20 to the frame 25. In some cases, the right dropout 95 can include a threaded insert (not shown) to attach the axle rod 110 to the right dropout 95. When assembled, the head 220 of the axle rod 110 abuts the left dropout 90. The illustrated axle rod 110 is only exemplary, and can be replaced by other suitable components (e.g., a quick connect skewer, etc.) to suit the desired connection between the rear wheel 20 and the frame 25.

Referring to FIGS. 2, 4, 5, and 7-9, a torque element 230 is attached to the first end 195 of the axle 105 and is shaped to fit within the recess 115 of the left dropout 90. FIGS. 5 and 7-9 show that the torque element 230 is wedge-shaped and is nested in the recess 115 such that the torque element 230 is substantially hidden from view when the bicycle 10 is viewed from adjacent the exterior sides of the frame 25. That is, the torque element 230 is shielded by the left dropout 90 on its upper and outer surfaces. As shown in FIGS. 2 and 4, the torque element 230 is housed in the dropout 90 when the rear wheel 20 is coupled to the frame 25 such that the torque element 230 is form fit into the dropout 90. As illustrated, an exterior wall or surface 235 of the torque element 230 is shaped to conform to the converging side walls 120 when the torque element 230 is disposed in the recess 115.

FIGS. 5, 7, and 8 show that the torque element 230 has a non-cylindrical aperture 240 (non-circular in cross-section) that is shaped to fit onto the first end 195 of the axle 105. In particular, the illustrated torque element 230 has a hexagonally-shaped aperture 240 that mates to the hexagonally-shaped first end 195 of the axle 105. A fastener 245 extends through a threaded hole 250 in the torque element 230 to secure the torque element 230 to the axle 105 so that when the rear wheel 20 is removed from the frame 25, the torque element 230 remains attached to the axle 105. In some constructions, the first end 195 and the torque element 230 can have other mating structures. For example, the first end 195 of the axle 105 can have other polygonal shapes (e.g., triangular, square, trapezoidal, pentagonal, etc.) and the aperture 240 can have a complementary polygonal shape. In other constructions, the first end 195 and the aperture 240 can have any complementary non-circular cross-sectional shapes (e.g., obround, oblong, etc.). In some cases, the torque element 230 can be press fit onto the axle 105.

As shown in FIG. 2, the bicycle 10 also includes a motor 255 that is drivingly coupled between the drive train 60 and the axle 105 to selectively provide motive force for the bicycle 10 via the rear wheel 20. Specifically, a stator portion of the motor is secured to the axle 105 and a rotor portion (not shown) of the motor 255 is coupled to the drive train 60. The motor 255 is electrically connected to a power source or battery pack 260 (e.g., stored in the down tube 55) by a power cable (not shown), and a controller can be used to control the motor 255 and other electrical accessories on the bicycle 10. As illustrated in FIGS. 4, 5, and 7-9 the torque element 230 has an extension 265 (near the bottom of the torque element 230, as viewed in FIG. 2) that defines a pocket 270 to hold the power cable away from other components of the rear wheel 20 (e.g., disc rotor bolts, not shown). With reference to FIGS. 7 and 8, the surfaces of the pocket 270 are angled generally upward from adjacent the exterior side of the torque element 230 toward the interior side of the torque element so that the power cable does not interfere with rotation of the rear wheel 20.

The torque element 230 is non-rotatably attached to the axle 105 and cooperates with the dropout 90 to resist torque from the motor 255 and thus prevent axle rotation in response to motor torque. To attach the wheel 20 with the motor 255 to the frame 25, the second end 200 of the rear axle 105 is aligned with the recess 145 in the right dropout 95, and the torque element 230 is aligned with the recess 115 in the left dropout 90. The torque element 230 slides generally vertically upward into the recess 115 of the left dropout 90 from the underside of the frame 25, and the second end 200 of the axle 105 is positioned in the recess 145 of the right dropout 95 and snugly aligned with the hole 160. The torque element 230 is accurately positioned in the left dropout 90 due to the complementary shapes of the recess 115 and the torque element 230. The axle rod 110 is then inserted through the left dropout 90, the axle 105, the hanger 135, and threaded into the right dropout 95 by engaging the appropriate tool with the head 220. Because the recess 115 is located on the interior side of the dropout 90, the torque element 230 is substantially hidden from view.

When the motor 255 is actuated, a significant amount of torque is applied to the wheel, and the axle 105 has a tendency to counter-rotate in response to motor torque. As described, the torque element 230 is fixed to the first end 195 of the axle 105 and snugly fits in the dropout 90 within the recess 115. The torque element 230 is essentially an internal component of the rear axle system 100 that is form fit into the dropout 90 and around the axle 105 to prevent axle rotation in response to motor torque. Due to the complementary oblong or wedge-shaped recess 115 and the torque element 230, the torque element 230 cannot move relative to the dropout 90. Further, because the torque element 230 is also rigidly attached to the axle 105, any tendency for the axle 105 to rotate in response to motor torque is prevented by the torque element 230. Stated another way, any tendency for axle rotation due to motor torque (or other factors) is inhibited due to the non-rotational attachment of the torque element 230 to the axle 105 and to the tight-fitting arrangement between the recess 115 and the torque element 230.

Various features and advantages of the invention are set forth in the following claims.

The invention claimed is:

1. A bicycle comprising:
 a wheel including an axle having a first end and a second end;
 a motor coupled to the axle;
 a frame supported by the wheel and including a first dropout defining a recess; and
 a torque element secured to the first end of the axle and shaped to fit within and conform to the shape of the recess of the first dropout to inhibit rotation of the axle relative to the frame in response to torque from the motor,
 wherein the torque element is nested in the recess such that the torque element is substantially hidden from view.

2. The bicycle of claim 1, wherein the first end of the axle is defined by a polygonal shape, and wherein the torque element includes an aperture shaped to mate with the end of the axle.

3. The bicycle of claim 2, wherein the end of the axle has a hexagonal shape and the aperture has a complementary hexagonal shape.

4. The bicycle of claim 3, wherein the torque element is held in engagement with the axle by a fastener.

5. The bicycle of claim 1, wherein the recess is defined by converging side walls and is accessible adjacent an underside of the frame to receive the torque element.

6. The bicycle of claim 5, wherein the converging side walls define the recess as wedge-shaped, and the torque element has an exterior surface engaged with at least one of the converging side walls.

7. A bicycle comprising:
 a wheel including an axle having a non-cylindrical first end and a second end;
 a motor coupled to the axle;
 a frame supported by the wheel and including a dropout having a first wall defining a recess; and
 a torque element non-rotationally coupled to the first end of the axle and including a second wall engageable with and shaped to conform to the first wall to inhibit rotation of the axle in response to torque from the motor,
 wherein the first wall includes converging side walls, and wherein the converging side walls define the recess as wedge-shaped, and the torque element has an exterior surface engaged with at least one of the converging side walls to prevent rotation of the axle.

8. The bicycle of claim 7, wherein the torque element is fully nested in the recess such that the torque element is substantially hidden from view.

9. The bicycle of claim 7, wherein the torque element has an aperture defined by a non-cylindrical shape conforming to the non-cylindrical shape of the first end.

10. The bicycle of claim 9, wherein each of the first end of the axle and the aperture is defined by a hexagonal shape.

11. The bicycle of claim 7, wherein the torque element is held in engagement with the axle by a fastener.

12. The bicycle of claim 7, wherein the torque element has an extension to support a cable.

* * * * *